Aug. 23, 1927.
W. B. CHURCHER
1,640,181
DYNAMO ELECTRIC SYSTEM
Filed July 16, 1924.
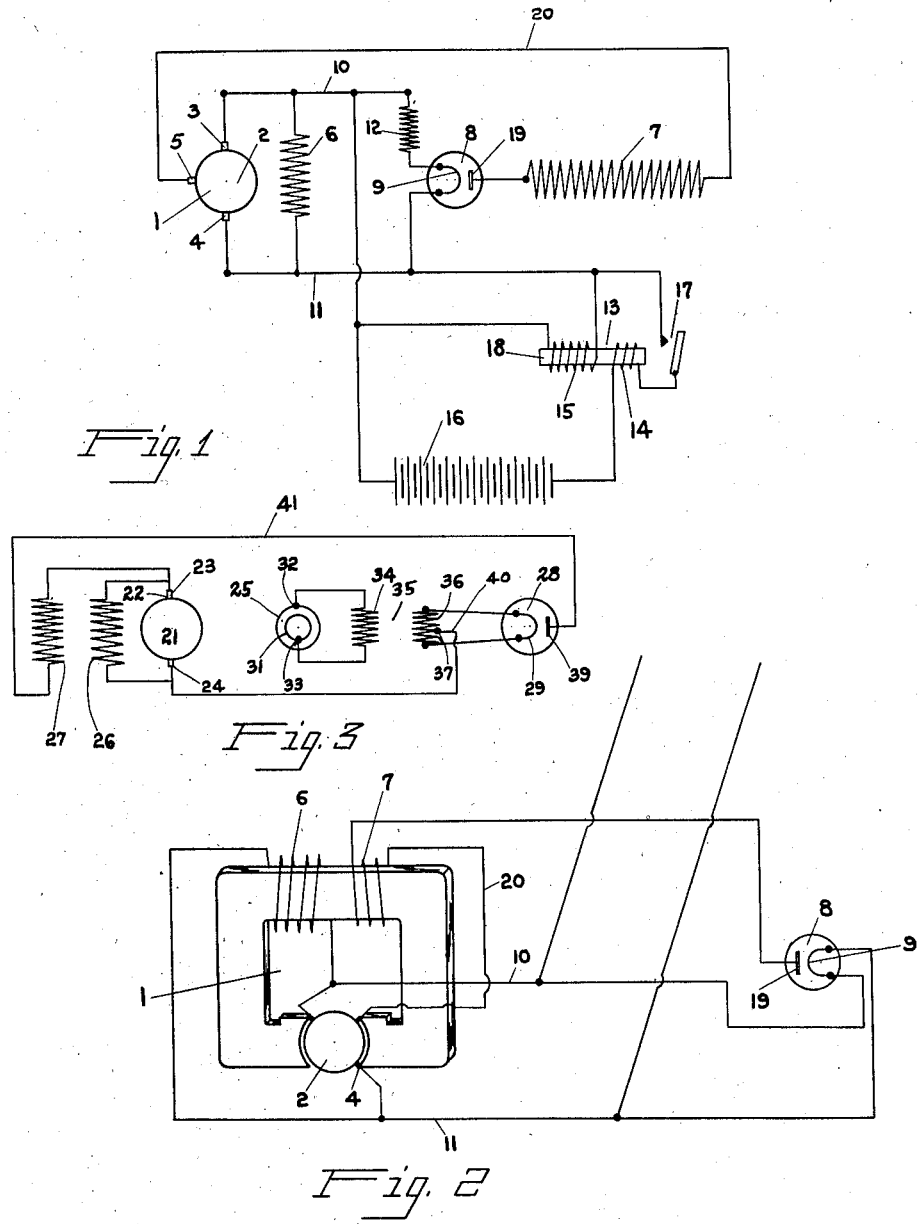
INVENTOR
William B. Churcher,
BY
Richey Slough + Watts,
his ATTORNEYS Patented Aug. 23, 1927.

1,640,181

UNITED STATES PATENT OFFICE.

WILLIAM B. CHURCHER, OF CLEVELAND HEIGHTS, OHIO, ASSIGNOR TO THE WHITE MOTOR COMPANY, OF CLEVELAND, OHIO, A CORPORATION OF OHIO.

DYNAMO-ELECTRIC SYSTEM.

Application filed July 16, 1924. Serial No. 726,283.

My invention relates to dynamo electric systems, and relates more particularly to dynamo electric systems in which the output of a generating unit is automatically controlled.

It is an object of my invention to provide such an improved dynamo electric system which comprises an electrical generator which may or may not be driven at varying rates of speed, but the terminal voltage of which may be limited by the incorporation of apparatus in the system operative without the actuation of any mechanical movable parts to limit the terminal voltage to a predetermined value.

Another object of my invention is to provide a system wherein the terminal voltage and the current supplied by a driven generator in the system is automatically controlled by a unit having no mechanical movable parts and which may be manually adjusted to alter its control upon the generator output.

Another object of my invention is to provide in such a system such a unit as above set forth which can be readily replaced by a different unit having the same or different generator voltage controlling properties.

Other objects of my invention and the invention itself will be apparent from the description thereof which follows and in which description reference will be had to the accompanying drawings forming a part of this specification.

In the drawings:—

Fig. 1 shows diagrammatically a system embodying the principles of my invention;

Fig. 2 shows likewise diagrammatically a system embodying the principles of my invention.

Fig. 3 illustrates another embodiment of my invention.

Referring now to each of the figures in both of which like parts are designated by like reference characters, at 1, I show a dynamo electric machine whose armature 2 is rotated by a suitable motor and said dynamo having a pair of current collecting brushes 3 and 4 and preferably a third brush 5 together with a shunt field winding 6 and a second field winding 7.

Associated with the said generator is a thermo-valve element comprising what is commonly known in the electrical arts as a diode tube shown diagrammatically at 8, the heating element of which, 9, is connected across the discharge circuit conductors 10 and 11 through a variable resistance 12, the conductors 10 and 11 leading from the current collecting brushes 3 and 4 respectively.

Referring now particularly to Fig. 1, at 13, I show a charging relay having a low resistance winding 14 and a high resistance winding 15, the said relay serving as a charging circuit cut-out for charging a storage battery 16 from the dynamo 1, said relay cut-out having a pair of contacts 17 adapted to be closed when the relay is energized and to be opened whenever the magneto motive effort set up by electrical current through the windings 14 and 15, is differential in its effects upon the core 18.

The relay 13 is but the usual cut-out commonly employed in electrical charging circuits and has no particular significance in the system herein illustrated, being shown merely as a common adjunct to such a system.

The system of my invention operates as follows—it being a well-known fact that a thermionic valve element such as that shown at 8 is operative when its filament 9 is heated to a certain predetermined critical degree to set up a current flow in a circuit comprising, serially connected, the heating filament 9, and the metallic plate 19 and the space between such filament and such plate under such a condition of heating permits a flow of electrical current from the filament to the plate in one direction, though opposing a flow in the opposite direction, assuming that such flow does not exceed a given predetermined value, in other words, that such flow is not caused by the existence of a predetermined electric potential across such filament and plate of excessive pressure. In other words, such an element operates as an electrical valve, so-called, permitting readily a flow of given polarity, but opposing a flow of opposite polarity and if an alternating current potential is impressed upon said filament and plate, such an element would permit only uni-directional impulses of current to flow through the circuit.

In the present case I employ the valve element 8 not as a rectifier, but as a current limiting device for a direct current flow operative to permit a direct current to flow in effective amount only when the filament 9 is heated to a sufficient degree, and I moreover provide means comprising a rheostat 12, manually variably controlled to cause the filament 9 to be heated to any desired predetermined degree upon a given potential existing across the terminals of the serially connected rheostat 12 and filament 9. Moreover, upon a given rheostat setting, my improved system provides that whenever the generator 1 generates more than a predetermined potential difference across its current collecting brushes 3 and 4, the filament 9 will be heated to such a degree as to permit the passage of electrons from the filament 9 to the plate 19 in such an amount that an electrical current will flow in the circuit which serially includes such filament and such plate and a field winding 7 for the generator 1, that the said field winding will be sufficiently energized by the current flowing through it to oppose the energization of the dynamo electric machine field cores, not shown in the drawings, but well understood in the art, so that there will be a consequent reduction in the magnetic field set up by the generator and effective to produce electric potential at the terminals 3 and 4 so that immediately such filament 9 is heated to the predetermined degree, by the rise of potential across the terminals 3 and 4, there will result a correcting influence which will reduce the potentials across such terminals.

Consequently within limits, and which are satisfactory for the practical purpose for which I propose to employ my invention, the thermionic valve 8 will supply current through the opposing field winding 7 in such volume and at such times as to maintain the voltage set up in the armature 2 at a substantially constant value. The flow of current through the winding of the opposing field 7, when the field 7 is exerting a corrective reducing influence on the voltage of the generator, passes from the negative terminal of the generator over circuit conductor 11 to the filament 9 and from thence to the plate 19 of the thermionic element 8 through the winding 7 returning to the armature 2 by circuit conductor 20, and which circuit conductor will lead to a point on the armature 2 maintained at a higher positive potential value than the potential existing at the armature brush 4 which is relatively negative thereto. Such a point may be the collector brush 5 which preferably, in a well-known manner is made adjustable so that it may contact with the commutator for the said armature at a mid-point intermediate the brushes 3 and 4 or may be shifted toward the brush 3 until it coincides in position with the brush 3. In this way, by rotation of the brush 5, to a desired adjusted position on the commutator, the current through the field winding may be varied by manual adjustment of the brush 5 to produce the desired counter magnetic force on the field of the generator.

The effect of the thermionic valve element 8 in causing a counter effect, tending towards the demagnetization of the generator field may likewise be modified in a somewhat similar manner by manual adjustment of the rheostat 12 to vary the current flow through the filament 9. Adjustment of the rheostat 12 will serve two purposes, first, it will operate to determine the critical generator voltage at which the thermionic valve will commence to function to limit the output voltage of the generator in the manner described, and, second, it may be used to a degree for the same purpose as the adjustable brush 5, namely to limit the demagnetization of the field by current through the opposing field winding 7.

By proper adjustment of the brush 5 in its position on the commutator, of the armature 2 and of the rheostat 12, the thermionic valve element may be set to commence to operate whenever the generator voltage commences to become excessive and its effect may be limited or increased by adjustment of the brush 5.

The electro-magnetic cut-out 13 functions in the usual way, the high resistance winding 15 serving to operate the relay and close the contact 17 to complete the charging circuit for the storage battery 16 whenever the generator voltage is sufficient to properly commence the charging operation, and the winding 14 when the relay is operated serving to maintain it closed until such time as the generator voltage falls below that of the storage battery voltage, or at some predetermined relative values of generator and battery voltage when the winding 14 will be energized to oppose the action of the winding 15, or to subtract from the total energization of the cut-out 13 in the usual manner to open the charging circuit by breaking the contact 17. I find that instead of employing the brush 5, my invention may be practiced by connecting the circuit conductor 20 directly to the brush 3, or by connecting the circuit conductor 20 to some point on the generator field winding 6 as may be desirable to secure the proper difference in potential required to cause the proper flow of current through the winding 7.

Referring now to the embodiment of my invention illustrated in Fig. 3, at 21 I show a direct current generator having collector brushes at 23 and 24 for an armature 22 and a pair of field windings 26 and 27 for energizing magnetically the generator, the winding 27 being so connected as to oppose the magnetization of the generator magnetic circuit set up by the field 26.

At 25 and 31 I show a pair of collector rings mounted on the armature 21 in the usual manner for securing an alternating current from the generator, these being mounted on the armature in addition to the commutator 22, and preferably on the other end of the armature in the usual way.

At 32 and 33 I show collector brushes and to these brushes I connect the primary 34 of a transformer 35, the secondary of the transformer being in two sections 36 and 37. Across the terminals of the transformer winding 36 and 37 connected in series, I connect the heating element or filament 29 of a thermionic valve 28 having a plate element 39, the heating of the element 29 adapted to cause the projection of electrons to the plate 39 according to the common theory now held for the action of such a thermionic valve. The field coil 26 is connected in shunt of the armature 22 through the brushes 23 and 24, the central tap 40 of the transformer 35 is connected to the brush 24 of the generator, and I then connect, by a circuit conductor 41, the opposing field winding 27 of the generator across the brushes 23 and 24, one terminal being connected directly to the brush 23 of the generator and the other terminal of the field winding being connected to the plate 39 of the thermiomic element. In this case, the thermionic valve permits the flow of current through the opposing current field winding 27 whenever the heating element 29 is sufficiently heated, the circuit comprising the generator armature 21, the valve 28, the windings 36 and 37 of the transformer and a circuit conductor 40 leading from a central tap between the transformer secondary windings, the valve functioning as a conductor of current only whenever the heating element is sufficiently heated to supply current through the opposing field 27. This only occurs upon a sufficient rise in voltage generated by the generator 21, in order to limit such voltage as in the foregoing systems previously described.

Having thus described my invention in a particular embodiment, I am aware that numerous and extensive departures may be made from the embodiment of my invention herein illustrated and described, but without departing from the spirit of my invention.

I claim:

In a charging system for storage batteries, the combination with a storage battery of a direct current generator adapted to charge the same, said generator comprising a pair of field windings, an armature, a pair of current collecting brushes contacting therewith, one of said windings being connected across said brushes, said brushes being relatively fixed to each other, and a third brush in contact with the generator armature intermediate the points of contact of the other brushes, and a thermionic electron discharge device having a filament and an anode, means to communicate current from the pair of brushes to the filament, said filament and anode being connected in serial circuit together with the other one of said generator windings between said last named brush and one of the other brushes, said windings being so disposed in their respective circuits that current through one of the windings will magnetically oppose the effect of current in the other winding.

In testimony whereof I hereunto affix my signature this 10th day of July, 1924.

WILLIAM B. CHURCHER.